J. BENYO.
PROPELLER FOR VESSELS.
APPLICATION FILED OCT. 24, 1908.

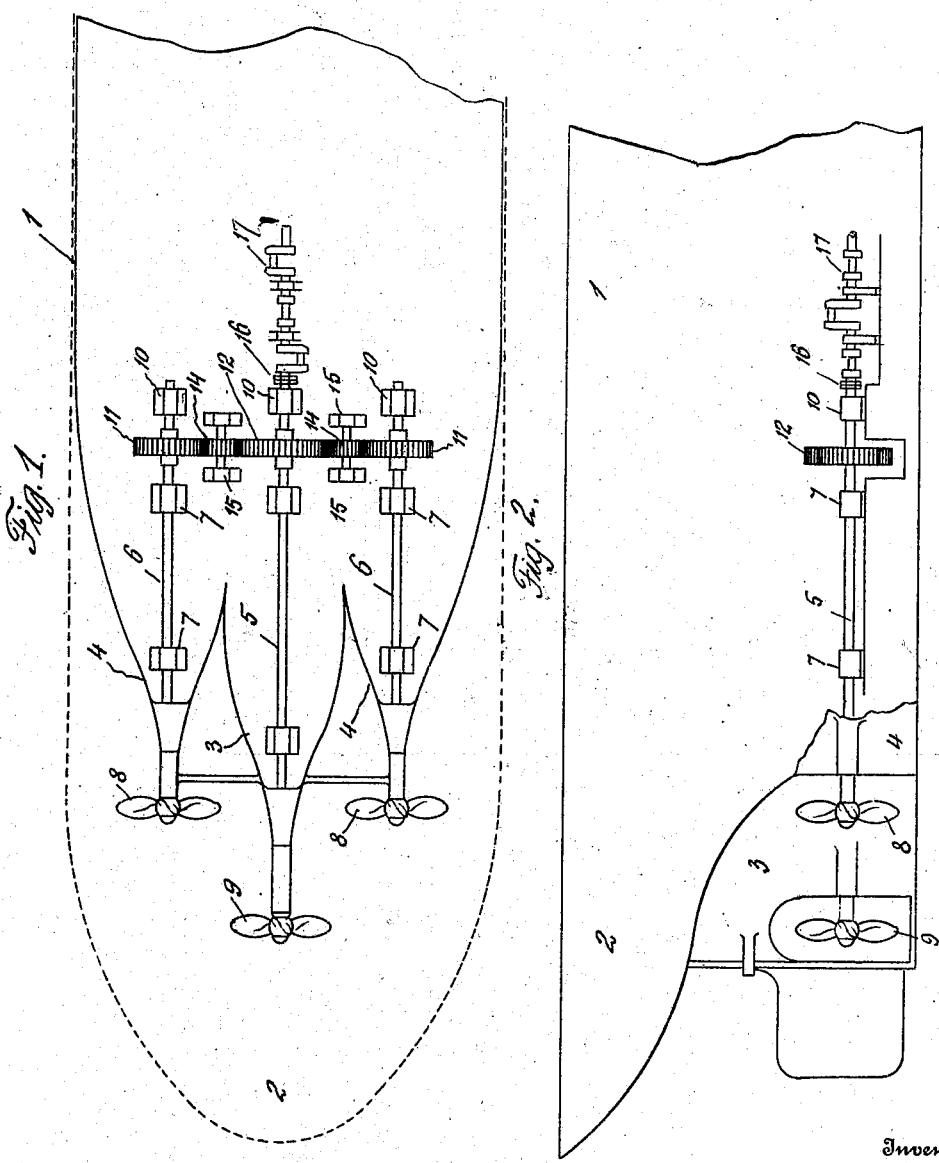

918,948.

Patented Apr. 20, 1909.
2 SHEETS—SHEET 2.

Witnesses
A. H. Rabsay,
R. H. Butler

Inventor
John BENYO,
By H. Evert &Co.
Attorneys

UNITED STATES PATENT OFFICE.

JOHN BENYO, OF MILWAUKEE, WISCONSIN.

PROPELLER FOR VESSELS.

No. 918,948.     Specification of Letters Patent.     Patented April 20, 1909.

Application filed October 24, 1908. Serial No. 459,290.

*To all whom it may concern:*

Be it known that I, JOHN BENYO, a subject of the King of Hungary, residing at Milwaukee, in the county of Milwaukee and State of Wisconsin, have invented certain new and useful Improvements in Propellers for Vessels, of which the following is a specification, reference being had therein to the accompanying drawing.

This invention relates to propellers for vessels, and the primary object of my invention is to provide a novel mechanism for driving a plurality of propellers from a single operating shaft.

Another object of my invention is to provide novel means for revolving a plurality of propellers in unison, thereby obtaining a higher degree of propelling power than if the propellers were independently driven.

A further object of this invention is to eliminate two of the engines used in a vessel of the triple propeller type, thereby obtaining greater space in the engine room of a vessel.

With the above and other objects in view which will be hereinafter described, the same consists in the novel construction, combination and arrangement of parts to be specifically claimed.

Figure 3:
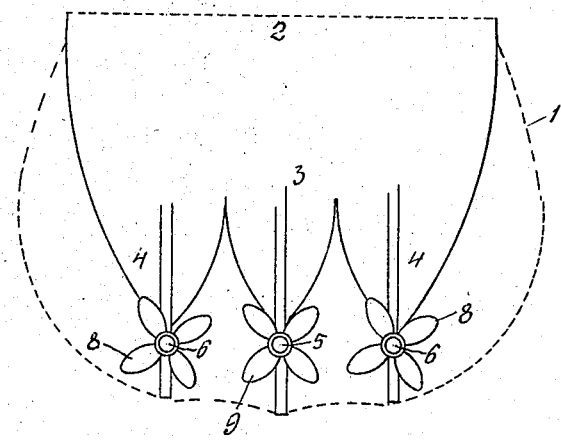
Figure 4:
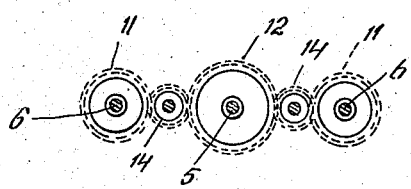

In the drawings:—Figure 1 is a diagrammatic view of a portion of the vessel equipped with my improved propelling mechanism, Fig. 2 is a side elevation of the same, Fig. 3 is an end view, and Fig. 4 is an elevation of a train of gears used in connection with the mechanism.

In the accompanying drawings, 1 designates a vessel having an overhanging stern 2 provided with housings 3 and 4 for propeller shafts 5 and 6, which are journaled in suitable bearings 7 located in the vessel, and for the sake of clearness, I shall designate the shaft 5 as the main propeller shaft, and the shafts 6 as the auxiliary propeller shafts. The housing 3 extends beyond the housings 4 and the main propeller shaft 5 in said housing is of a greater length than the auxiliary propeller shafts 6. All these shafts are parallel, and the outer ends of said shafts are provided with propellers 8 and 9. The propellers 8 are directly opposite transversely of the vessel, while the propeller 9 is in rear of the propellers 8, this arrangement of the propellers allowing said propellers to operate in different bodies of water. In conjunction with the bearings 7, additional bearings 10 are provided for the forward ends of the propeller shafts 5 and 6. Upon the propeller shafts 6, between the bearings 7 and 10, are mounted gear wheels 11 and upon the propeller shaft 5 is mounted a large gear wheel 12. Interposed between the gear wheels 11 and 12 and meshing therewith are small gear wheels 14, these gear wheels being journaled between bearings 15 arranged in the vessel contiguous to the bearings 7 and 10. The gear wheels 11 being smaller in diameter than the gear wheels 12, the latter being on the propeller shaft which is coupled direct to the operating shaft of the engine, it is obvious that the shafts 6 are revolved at a greater rate of speed than the shaft 5. Coupled to the forward end of the propeller shaft 5, as at 16, is a crank or operating shaft 17 of a suitable engine (not shown) employed for driving said shaft.

By the train of gears used in connection with the operating shaft and the propeller shafts, it will be observed that the propeller shafts are all driven in the same direction.

I reserve the right to make provision for lubricating the various bearings and train of gears forming part of the mechanism and to use the mechanism in connection with vessels of various types.

Having now described my invention what I claim as new, is:—

The combination with a vessel having the stern thereof provided with triple housings arranged in the same plane with the intermediate housing extending beyond the rear ends of the two outside housings, a main propeller shaft journaled in said intermediate housing, a driving shaft connected to said main propeller shaft, a gear wheel carried by the main propeller shaft at its inner end, auxiliary propeller shafts journaled in said two outside housings, a gear wheel on each of said auxiliary propeller shafts, said gear wheels being of less diameter than the gear wheel on the main propeller shaft, pinions intermeshing with the gear on the main propeller shaft and the gears on the auxiliary propeller shafts, and a propeller wheel on the outer end of each of said propeller shafts, the propeller wheels on the auxiliary propeller shafts being directly opposite transversely of the vessel and the propeller wheel on the main propeller shaft being in rear of the other propellers and in the same plane therewith.

In testimony whereof I affix my signature in the presence of two witnesses:

JOHN BENYO.

Witnesses:
MICHAEL J. KOLESAR,
MIKO KOVIAES.